(12) United States Patent
Okuta et al.

(10) Patent No.: US 9,212,736 B2
(45) Date of Patent: Dec. 15, 2015

(54) HOLDING STRUCTURE OF INTERVENING MEMBER, INTERVENING MEMBER, AND WOBBLING-PREVENTION MEMBER

(75) Inventors: Tomohide Okuta, Swidnica (PL); Seiji Miyamoto, Hiroshima (JP); Masako Shinohara, Hiroshima (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 476 days.

(21) Appl. No.: 13/407,212

(22) Filed: Feb. 28, 2012

(65) Prior Publication Data
US 2012/0222517 A1 Sep. 6, 2012

(30) Foreign Application Priority Data

Mar. 1, 2011 (JP) ................................. 2011-044181

(51) Int. Cl.
*F16H 57/04* (2010.01)
*F16B 21/08* (2006.01)

(52) U.S. Cl.
CPC ........ *F16H 57/0457* (2013.01); *F16H 57/0423* (2013.01); *F16B 21/086* (2013.01); *Y10T 74/2186* (2015.01)

(58) Field of Classification Search
CPC ...... F16B 21/084; F16B 21/082; F16B 21/08; F16B 21/09; F16B 21/125; F16H 57/0423; F16H 57/0426; F16H 57/0421; F16H 57/028; F16H 57/031; F16H 57/042; Y10T 74/2186; Y10T 74/219; Y10T 74/2191; Y10T 74/2193
USPC ......................... 74/606 E, 606 A, 607; 24/297
See application file for complete search history.

(56) References Cited

U.S. PATENT DOCUMENTS 8,291,547 B2   10/2012 Ukai et al.
8,393,248 B2 *  3/2013 Nagahama et al. ......... 74/606 R
(Continued)

FOREIGN PATENT DOCUMENTS

CN   101782123 A   7/2010
DE    19533978 B4  9/2004
(Continued)

OTHER PUBLICATIONS

China Patent Office, "Office Action for CN201210052109.0," May 28, 2014.
(Continued)

*Primary Examiner* — Richard W Ridley
*Assistant Examiner* — Yamilka Pinero Medina
(74) *Attorney, Agent, or Firm* — Manabu Kanesaka

(57) ABSTRACT

A holding structure of an intervening member is provided for preventing the dropping-out of a wobbling-prevention member at an assembly time, and to extend an applicable range of rigidity of the intervening member to a low-side range. The holding structure of the intervening member includes a baffle plate intervened between a torque converter housing wall and an intervening member, and a wobbling-prevention member interposed between the baffle plate and the torque converter housing wall in a compressed state. A bottom portion of a concave portion is clamped between a head portion and a bulging portion of the wobbling-prevention member. Also, an inside of the head portion is hollow, so when the head portion is crushed and deformed, the air inside the head portion is discharged to the outside through an annular gap to reduce a compressive load relative to the baffle plate.

3 Claims, 5 Drawing Sheets

(56) References Cited

U.S. PATENT DOCUMENTS

| | | |
|---|---|---|
| 2006/0060424 A1 | 3/2006 | Tominaga et al. |
| 2007/0289107 A1* | 12/2007 | Alhof et al. ................ 24/297 |
| 2009/0089982 A1* | 4/2009 | Higgins et al. .............. 24/297 |
| 2010/0192335 A1 | 8/2010 | Ukai et al. |
| 2010/0212252 A1* | 8/2010 | Chou et al. ................ 52/716.5 |
| 2011/0030177 A1* | 2/2011 | Ukai et al. .................. 24/458 |
| 2011/0167590 A1 | 7/2011 | Ukai et al. |
| 2012/0145483 A1 | 6/2012 | Araki |

FOREIGN PATENT DOCUMENTS

| | | |
|---|---|---|
| EP | 1637777 A2 | 3/2006 |
| EP | 2148114 A1 | 1/2010 |
| JP | S51-16161 U | 2/1976 |
| JP | S51-74569 U | 6/1976 |
| JP | S57-65265 U | 4/1982 |
| JP | S58-106635 U | 7/1983 |
| JP | H04-136559 | 5/1992 |
| JP | 2003-329108 A | 11/2003 |
| JP | 2004-084405 A | 3/2004 |
| JP | 2007-239812 A | 9/2007 |
| JP | 2009-108890 A | 5/2009 |
| JP | 2011-27209 A | 2/2011 |
| WO | 2010/001994 A1 | 1/2010 |
| WO | 2011/013647 A1 | 2/2011 |

OTHER PUBLICATIONS

Japan Patent Office, "Office Action for JP 2011-044181," Sep. 30, 2014.

Europe Patent Office, "Search Report for EP 12157775.3," May 4, 2015.

* cited by examiner

HOLDING STRUCTURE OF INTERVENING MEMBER, INTERVENING MEMBER, AND WOBBLING-PREVENTION MEMBER

BACKGROUND OF THE INVENTION AND RELATED ART STATEMENT

The present invention relates to a holding structure of an intervening member, an intervening member used for the holding structure of the intervening member thereof, and a wobbling-prevention member preventing the intervening member thereof from wobbling.

As the holding structure of the intervening member, there is a holding structure of the intervening member in which the intervening member is intervened between a first member and a second member. For example, in Japanese Unexamined Patent Publication No. H04-136559, in consideration of an assembly, there is proposed the holding structure of the intervening member comprising a protruding end portion, in which rubber is attached, in the other end portion of the intervening member while one end portion of the intervening member is attached to the first member, and the protruding end portion and the like is fitted into a fitting portion formed in the second member.

However, in the holding structure of the intervening member, from a standpoint of a reduction in the number of components and the like, there is the holding structure of the intervening member holding only by clamping the intervening member between the first member and the second member, and also at a time of the holding thereof, preventing the intervening member from wobbling. In such holding structure, generally, the wobbling-prevention member is interposed between the intervening member and at least one of either the first member or the second member, so that when the intervening member is intervened between the first member and the second member, the wobbling-prevention member is compressed. Thereby, based on the compression of the wobbling-prevention member, a repulsion force is generated, so that due to the repulsion force thereof, the intervening member is controlled from wobbling between the first and second members.

However, in the holding structure of the intervening member, as the wobbling-prevention member, generally, rubber bush is used, and the rubber bush thereof is simply temporarily fitted (temporarily fastened) into a concave portion formed in the intervening member. Therefore, when an assembling operation of intervening of the intervening member between the first and second members is carried out, there is a possibility that the rubber bush thereof drops out of the concave portion of the intervening member. Consequently, in a case where the rubber bush drops out, it is necessary to pick up the rubber bush thereof, and redo the assembling operation again, so that the dropping-out of the rubber bush declines workability.

Also, when the first and second members and the intervening member are assembled, in order to control the wobbling of the intervening member between the first and second members, the rubber bush as the wobbling-prevention member is compressed up to a predetermined compressed state. However, in order to make the rubber bush in the predetermined compressed state, a very high compressive load is necessary. Consequently, in a case where the rubber bush is used as the wobbling-prevention member, the intervening member with high rigidity is necessary, so that using the intervening member with low rigidity becomes difficult.

The present invention is made in view of the aforementioned circumstances. The first technical object is to provide a holding structure of the intervening member which can prevent the dropping-out of the wobbling-prevention member at an assembly time, and also can extend an applicable range of the rigidity of the intervening member to a low-side range.

A second technical object is to provide an intervening member used for the holding structure of the intervening member.

A third technical object is to provide a wobbling-prevention member used for the holding structure of the intervening member.

Further objects and advantages of the invention will be apparent from the following description of the invention.

SUMMARY OF THE INVENTION

In order to achieve the first technical object, the present invention (the invention with respect to the first aspect) is a holding structure of an intervening member, wherein an intervening member is intervened between a first member and a second member, and wherein a wobbling-prevention member, which prevents the intervening member from wobbling, is interposed between the intervening member and at least one member of the first member or the second member in a compressed state. In the holding structure of the intervening member, the intervening member comprises a supporting plate portion provided in such a way as to face the aforementioned one member. A through-bore is formed in the supporting plate portion in such a way that an extending direction of an axis center of the through-bore faces a parallel-arranged direction of the first and second members.

The wobbling-prevention member integrally comprises an axis portion slidably passing through the through-bore of the supporting plate portion, wherein one end portion thereof is positioned on the aforementioned one member side rather than the supporting plate portion, and also wherein the other end portion thereof is positioned on a side away from the aforementioned one member rather than the supporting plate portion; an umbrella elastic head portion integrally provided in one end portion of the axis portion, and expanding a radius as approaching from one end portion to the supporting plate portion; and a bulging portion formed on the other end side of the axis portion rather than the supporting plate portion of the axis portion in a state of expanding the radius more than the radius of the through-bore, and clamping the supporting plate portion in cooperation with the elastic head portion. A preferable aspect of the first aspect is as described in second to sixth aspects.

In order to achieve the second technical object, in the present invention (the invention with respect to a seventh aspect), the intervening member is intervened between the first member and the second member, and the supporting plate portion is provided in such a way as to face at least one member of the first member or the second member. The through-bore is formed in the supporting plate portion in such a way that an axis center direction of the through-bore faces the parallel-arranged direction of the first and second members. The wobbling-prevention member is held in the supporting plate portion, and integrally comprises the axis portion slidably passing through the through-bore of the supporting plate portion, wherein one end portion thereof is positioned on the aforementioned one member side rather than the supporting plate portion, and also wherein the other end portion thereof is positioned on the side away from the aforementioned one member rather than the supporting plate portion; the umbrella elastic head portion integrally provided in one end portion of the axis portion, and expanding the radius as approaching from one end portion to the supporting plate portion; and the bulging portion formed on the other end side of the axis portion rather than the supporting plate portion of the axis portion in the state of expanding the radius more than the radius of the through-bore, and clamping the supporting plate portion in cooperation with the elastic head portion. A preferable aspect of the seventh aspect is as described in eighth to twelfth aspects.

In order to achieve the third technical object, in the present invention (the invention with respect to a thirteenth aspect), under a state wherein the intervening member is intervened between the first member and the second member, the wobbling-prevention member is interposed between the intervening member and at least one member of the first member or the second member so as to prevent the intervening member from wobbling. The wobbling-prevention member is used relative to the intervening member wherein the supporting plate portion is provided in such a way as to face the aforementioned one member, and also wherein the through-bore is formed in the supporting plate portion in such a way that the axis center direction of the through-bore faces the parallel-arranged direction of the first and second members. The wobbling-prevention member integrally comprises the axis portion slidably passing through the through-bore of the supporting plate portion, wherein one end portion thereof is positioned on the aforementioned one member side rather than the supporting plate portion, and also wherein the other end portion thereof is positioned on the side away from the aforementioned one member rather than the supporting plate portion; the umbrella elastic head portion integrally provided in one end portion of the axis portion, and expanding the radius as approaching from one end portion to the supporting plate portion; and the bulging portion formed on the other end side of the axis portion rather than the supporting plate portion of the axis portion in the state of expanding the radius more than the radius of the through-bore, and clamping the supporting plate portion in cooperation with the elastic head portion.

According to the present invention (the invention with respect to the first aspect), since the elastic head portion and the bulging portion of the wobbling-prevention member clamp the supporting plate portion, the wobbling-prevention member is accurately held in the supporting plate portion so as to prevent the wobbling-prevention member from dropping out at a time of an assembling operation of the first and second members, and the intervening member. Consequently, a decline of assembling workability based on the dropping-out of the wobbling-prevention member can be prevented.

Also, when the intervening member is intervened between the first member and the second member, the wobbling-prevention member held in the intervening member is compressed for wobbling prevention. However, since the umbrella elastic head portion is provided in one end portion of the axis portion of the wobbling-prevention member, and the inside of the elastic head portion is hollow, compared to the elastic head portion whose inside is not hollow and is solid, a compressive load relative to the intervening member can be lowered. Consequently, it eliminates the need to excessively increase rigidity of the intervening member so as to be capable of expanding an applicable range of the rigidity of the intervening member to a low-side range.

According to the invention with respect to the second aspect, the axis portion is in a loosely fitted state relative to the through-bore; an annular gap is formed between the axis portion and an inner peripheral surface of the through-bore; and an internal space inside the elastic head portion faces the outside through the annular gap. Accordingly, accompanied by the compression of the wobbling-prevention member (the elastic head portion) (when the intervening member is intervened between the first member and the second member), the air inside the umbrella elastic head portion is smoothly discharged to the outside through the annular gap, so that compared to a case of the aforementioned first aspect, the required compressive load (the compressive load required for the wobbling prevention) can be lowered further, and also can be easily adjusted. Accompanied by the above, the intervening member having the further lower rigidity can be used as well.

In that case, the axis portion slides the through-bore of the supporting plate portion, and guides the elastic head portion in such a way as to compress at a predetermined position of the supporting plate portion, so that the head portion can be accurately compressed on the supporting plate portion.

According to the invention with respect to the third aspect, the bulging portion has elasticity, and also is set in such a way as to expand the radius as the bulging portion goes to one end side from the other end side of the axis portion, so that when the wobbling-prevention member is assembled relative to the supporting plate portion, the axis portion in the wobbling-prevention member is pushed into the through-bore of the supporting plate portion from the other end side. Accordingly, the bulging portion smoothly passes through the through-bore while reducing the radius so as to be capable of easily disposing the bulging portion on the other end side of the axis portion rather than the supporting plate portion.

Also, since the bulging portion abuts against the supporting plate portion with a surface of the largest radius, the axis portion of the wobbling-prevention member is reliably controlled from moving toward an outward side on one end side of the axis portion. Consequently, the wobbling-prevention member is prevented from dropping out of the supporting plate portion (the intervening member) so as to be capable of reliably preventing the assembling workability from declining.

According to the invention with respect to the fourth aspect, as the supporting plate portion of the intervening member, a bottom portion inside a concave portion provided in the intervening member is used, and the elastic head portion of the wobbling-prevention member protrudes to an outward side of an opening of the concave portion from the inside of the concave portion, so that while obtaining a repulsion force based on the compression of the wobbling-prevention member, an end surface of the opening of the concave portion can be used as a supporting surface (a stopper surface) relative to one member. Consequently, while the repulsion force based on the compression of the wobbling-prevention member is acting on one member, one member thereof can be abutted against the end surface of the opening of the concave portion of the intervening member so as to be capable of accurately supporting (holding) the intervening member without wobbling the intervening member relative to one member.

According to the invention with respect to the fifth aspect, the wobbling-prevention member is interposed between the intervening member and one member of the first member or the second member in the compressed state, and a component portion of the intervening member and the other member of the first member or the second member are concave-convex-fitted at least in two places, so that the intervening member can be controlled from sliding and relative-turning between the first member and the second member by not only a holding force based on the first and second members, and the wobbling-prevention member, but also by the concave-convex fitting between the intervening member and the other member. Consequently, the wobbling of the intervening member can be prevented highly reliably.

According to the invention with respect to the sixth aspect, one member of the first and second members is a torque converter housing wall, and the other member of the first and second members is a transmission case which includes an opening closed by the torque converter housing wall, and also includes a partition wall dividing the inside on an inward side rather than the opening thereof. The intervening member is intervened between the partition wall of the transmission case and the torque converter housing wall, and is a baffle plate which adjusts a flow of scattered lubricant oil based on a power transmission element disposed between the partition wall of the transmission case and the torque converter housing wall, so that under a condition wherein the torque converter housing wall is attached to the transmission case, the baffle plate can be accurately held without wobbling.

According to the present invention (the invention with respect to the seventh aspect), by using the intervening member, there can be obtained the holding structure of the intervening member with respect to the aforementioned first aspect. Consequently, there can be provided the intervening member used for the holding structure of the intervening member with respect to the first aspect. Also, according to the invention with respect to the eighth to twelfth aspects, there can be obtained operational effects equal to the operational effects respectively corresponding to the invention with respect to the second to sixth aspects.

According to the present invention (the invention with respect to the thirteenth aspect), by using the wobbling-prevention member, there can be obtained the holding structure of the intervening member with respect to the first aspect. Consequently, there can be provided the wobbling-prevention member used for the holding structure of the intervening member with respect to the first aspect.

DETAILED DESCRIPTION OF PREFERRED EMBODIMENTS

Hereinafter, embodiments of the present invention will be explained with reference to drawings.

Figure 1:
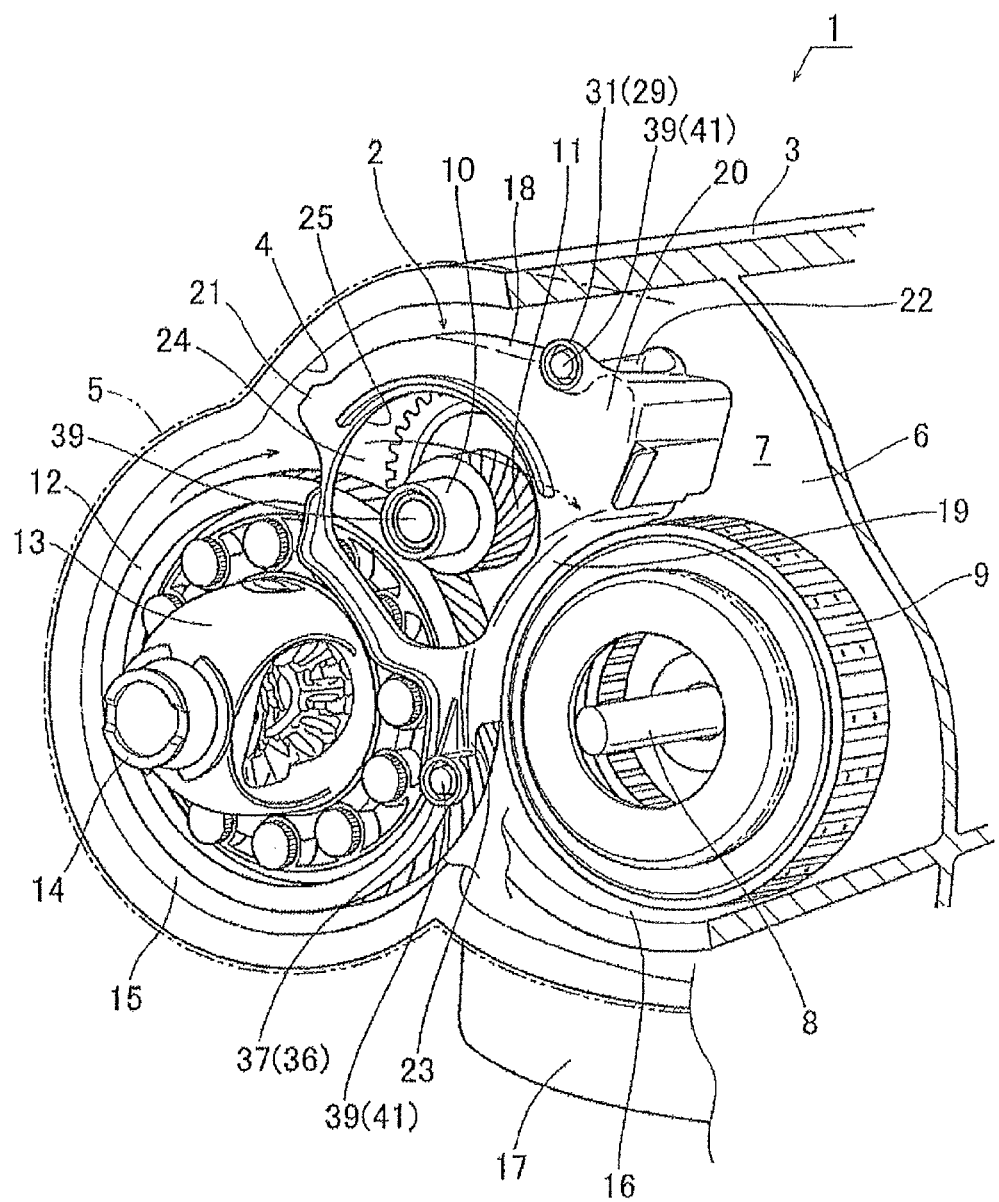
FIG. 1 is a perspective view showing a state wherein a baffle plate as an intervening member with respect to an embodiment is intervened between a torque converter housing wall (first member) and an intermediate wall (second member) of a transmission case.

FIG. 1 shows an automatic transmission 1 in which a baffle plate 2 with respect to the embodiment is mounted. The automatic transmission 1 includes a cylindrical transmission case (a second member) 3, and one opening 4 thereof is closed by a torque converter housing wall (a first member, and one member: in FIG. 1, it is shown with a virtual line) 5, and the other opening (not shown in the drawings) is closed by an end cover (not shown in the drawings). Inside the transmission case 3, an intermediate wall 6 is provided as a partition wall, and in a space 7 between the intermediate wall 6 and the torque converter housing wall 5, there are disposed an input axis 8 wherein a power from a torque converter is input; a clutch drum 9 transmitting the power, which has been input into the input axis 8, to a transmission mechanism (not shown in the drawings) disposed between the intermediate wall 6 and the end cover; an output gear 11 receiving the power from the transmission mechanism through an intermediate axis 10; a ring gear 12 engaged with the output gear 11 and receiving the power from the output gear 11; and an output axis 14 receiving the power which has been input into the ring gear 12 through a differential mechanism 13.

In that case, the ring gear 12 and the clutch drum 9 are arranged in parallel while the clutch drum 9 is slightly heightened, and the output gear 11 is disposed between the ring gear 12 and the clutch drum 9 in a position higher than both the ring gear 12 and the clutch drum 9. On an outward side in a radial direction of the ring gear 12, there is formed the transmission case 3 (a peripheral wall) with a curved shape along the ring gear 12. A lower portion of the transmission case 3 comprises an oil reservoir portion 15 reserving lubricant oil. Thereby, the lubricant oil reserved in the oil reservoir portion 15 taken up by the ring gear 12 so as to be supplied to a clutch drum 9 side (see an arrow in FIG. 1).

Incidentally, in FIG. 1, the reference numeral 17 represents an oil pan attached to the lower portion of the transmission case on a downward side of the input axis 8 and a petition wall portion 16. The lubricant oil guided into the oil pan 17 is supplied to the output axis 14 by a pump (not shown in the drawings), and when the lubricant oil fulfills a role of lubrication there, the lubricant oil is accumulated in the oil reservoir portion 15. Also, on a lower side of the clutch drum 9, there is formed the petition wall portion 16 with a curved shape along an outer periphery of the clutch drum 9 inside the transmission case 3. The lubricant oil which has been guided into the petition wall portion 16 is discharged into the oil pan 17 without being reserved.

As shown in FIG. 1, in the space 7 between the torque converter housing wall 5 and the intermediate wall 6 of the transmission case 3, there is disposed the baffle plate 2 as an intervening member. The baffle plate 2 controls the lubricant oil in the oil reservoir portion 15, which has been taken up by the ring gear 12, from being excessively scattered to the clutch drum side 9 so as to control a resistance increase. Consequently, the baffle plate 2 integrally comprises a first control wall portion 18; a second control wall portion 19; a connection wall portion 20; pillar portions 21 and 22; and a supporting portion 23.

As shown in FIG. 1, the first control wall portion 18 is disposed on an outer peripheral side of an upper portion of the output gear 11. The first control wall portion 18 extends from a ring gear 12 side, which is one end side, to the clutch drum 9 side, which is the other end side, while drooping toward the intermediate wall 6. The first control wall portion 18 controls a scattering movement of the lubricant oil, which has been taken up by the ring gear 12, to an oblique upward side.

Figure 2:
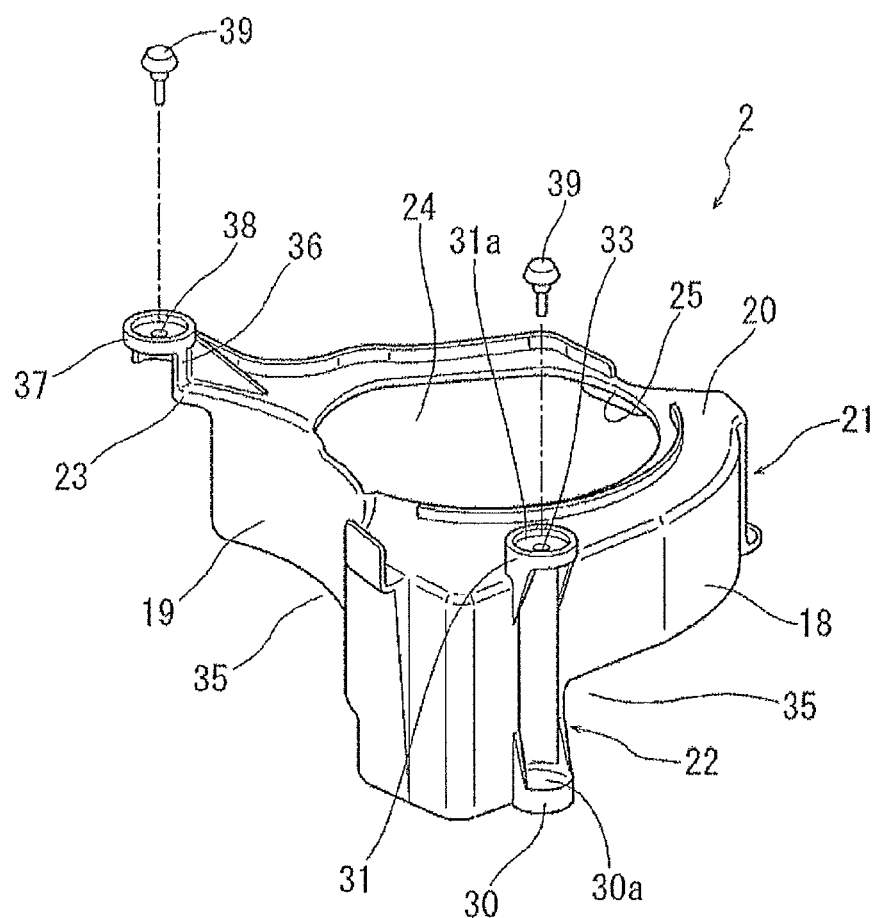
FIG. 2 is a perspective view showing the baffle plate with respect to the embodiment.
Figure 3:
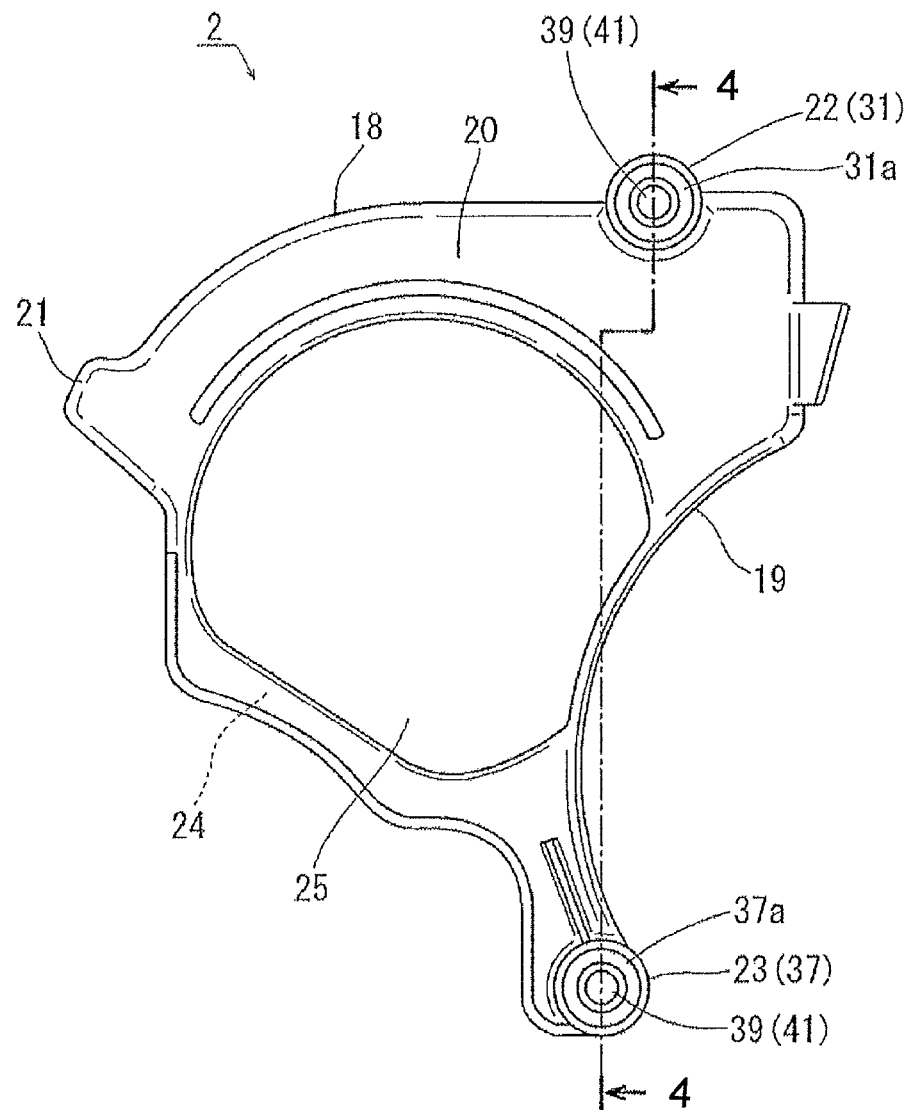
FIG. 3 is a drawing showing a connection wall portion of the baffle plate with respect to the embodiment.

As shown in FIG. 1, the second control wall portion 19 continues to the first control wall portion 18. The second control wall portion 19 extends along the outer periphery of the clutch drum 9, while drooping toward the intermediate wall 6 between the clutch drum 9 and the ring gear 12. The second control wall portion 19 separates from the first control wall portion 18 as the second control wall portion 19 goes toward an extending end side thereof (the downward side), and the extending end faces the oil reservoir portion 15 from the upward side. Thereby, the second control wall portion 19 controls the scattering movement (see an arrow in FIG. 2) of the lubricant oil to the clutch drum 9 side so as to guide that to the oil reservoir portion 15 as the lubricant oil.

While the connection wall portion 20 is directly facing the torque converter housing wall 5, the connection wall portion 20 is disposed in parallel to the torque converter housing wall 5. The connection wall portion 20 connects end surfaces of the first and second control wall portions 18 and 19 in a side close to the torque converter housing wall 5. The first and second control wall portions 18 and 19, and the connection wall portion 20 divide an internal space, and the internal space is open through an opening 24 between the extending end of the second control wall portion 19 and the first control wall portion 18. Consequently, one portion of the ring gear 12 is entered into the internal space through the opening 24. Also, in the connection wall portion 20, there is formed a large opening 25 in a center portion, and the intermediate axis 10 and the output gear 11 face an inside of an opening 25 area thereof.

Figure 4:
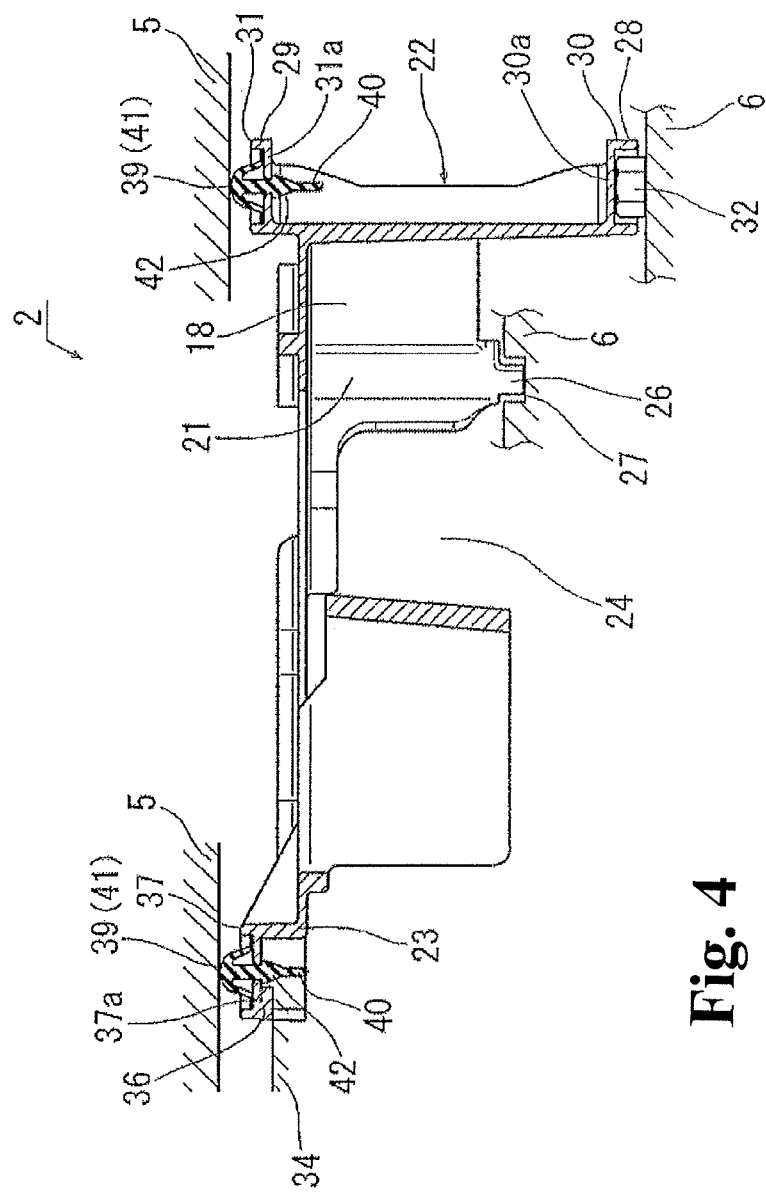
FIG. 4 is a drawing explaining the state wherein the baffle plate with respect to the embodiment is intervened between the torque converter housing wall and the intermediate wall of the transmission case with a cross-sectional surface taken along a line 4-4 in FIG. 3.
Figure 5:
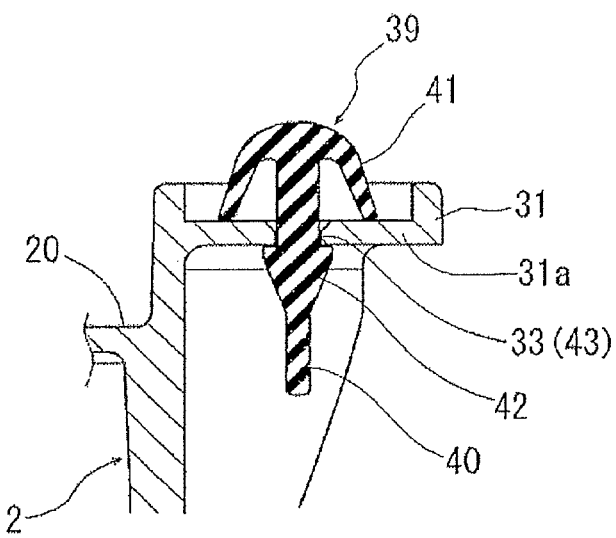
FIG. 5 is a longitudinal cross-sectional view showing a wobbling-prevention member with respect to the embodiment attached to the intervening member.

As shown in FIGS. 1 to 4, the pillar portion 21 extends in such a way as to bridge between the connection wall portion 20 and the intermediate wall 6 on one end side of the first control wall portion 18. In the present embodiment, the pillar portion 21 is formed by externally bulging the first control wall portion 18. Among end surfaces in an extending direction of the pillar portion 21, as shown in FIG. 4, on an end surface close to the intermediate wall 6, there is formed a fitting convex portion 26, and the fitting convex portion 26 is fitted into a fitting concave place 27 formed in the intermediate wall 6 beforehand.

As shown in FIGS. 1 to 4, the pillar portion 22 extends in such a way as to cross between the connection wall portion 20 and the intermediate wall 6 on the other end side of the first control wall portion 18. In the present embodiment, the pillar portion 22 is formed basically in a state wherein a cylindrical shape is split in half in an axis-center extending direction, and in order to form a half-split state thereof, the first control wall portion itself bulges inwardly. On both sides in the extending direction of the pillar portion 22, there are respectively provided cylindrical portions 28 and 29. In each cylindrical portion 28 (29), there is provided a partition wall 30a (31a) closing an inside thereof, and there is formed a concave portion (31) wherein the partition wall 30a (31a) is a bottom portion (hereinafter, the reference numeral 30a (31a) will be used). Of the concave portion 30 (31), in the concave portion 30 which is close to the intermediate wall 6, there is fitted a head portion of a bolt attached beforehand to the intermediate wall 6. Thereby, combined with the concave-convex fitting between the fitting convex portion 26 of the pillar portion 21 and the fitting concave place 27 of the intermediate wall 6 (the concave-convex fitting at two places), the baffle plate 2 is controlled from sliding and from relative-turning as well.

Figure 6:
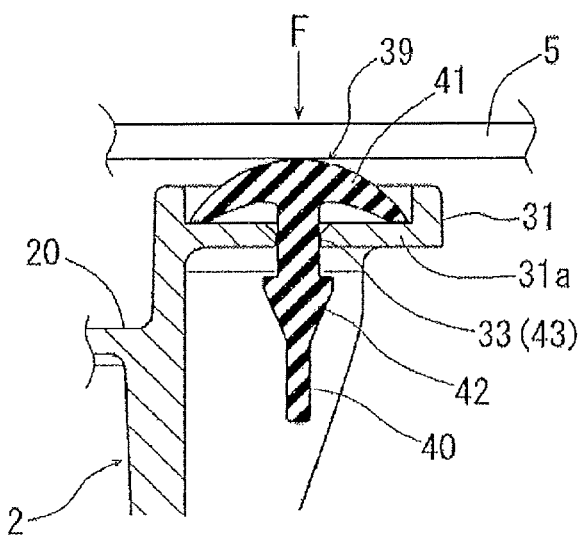
FIG. 6 is an explanatory drawing showing an operating state of the wobbling-prevention member when the baffle plate is intervened between the torque converter housing wall and the intermediate wall of the transmission case.

On the other hand, regarding the other concave portion 31 in the pillar portion 22, as shown in FIGS. 1 and 6, the bottom portion 31a is provided approximately in parallel by facing the torque converter housing wall 5, and in a center portion in a radial direction of the bottom portion 31a, there is formed a through-bore 33.

As shown in FIGS. 1 to 4, the supporting portion 23 is formed by extending the connection wall portion 20 to the outward side of the extending end of the second control wall portion 19. When the pillar portions 21 and 22 (the fitting convex portion 26 and the concave portion 30) are concave-convex-fitted into the intermediate wall 6 (the fitting concave place 27 and the bolt head portion 32), the supporting portion 23 abuts against a top of a standing wall portion 34 which stands up from the intermediate wall 6, so that the connection wall portion 20 is supported by the intermediate wall 6 through the supporting portion 23 and the pillar portions 21 and 22. At that time, the first control wall portion 18 and the second control wall portion 19 somewhat separate from the intermediate wall 6 so as to form belt-like openings 35 respectively between the first control wall portion 18 and the intermediate wall 6, and between the second control wall portion 19 and the intermediate wall 6. Thereby, the lubricant oil, which has been taken up by the ring gear 12, is controlled from the scattering movement by the first and second control walls. However, due to each opening 35, the lubricant oil scatters and moves to the outward side of the baffle plate 2 (the clutch drum 9 side) in some degree.

Also, on the supporting portion 23, there is integrally provided a cylindrical portion 36 as well. The cylindrical portion 36 is set in such a way that an end surface thereof forms the same level plane surface as the end surface of the cylindrical portion 31 provided in the pillar portion 22, and a lower portion thereof is formed in the half-split state. In the cylindrical portion 36, there is integrally provided a partition wall 37a closing the inside as well. Thereby, there is formed a concave portion 37 wherein the partition wall 37a is the bottom portion (hereinafter, the reference numeral 37a is used). The bottom portion 37a of the concave portion 37 is also provided approximately in parallel by facing the torque converter housing wall 5, and in a center portion in a radial direction of the bottom portion 37a, there is formed a through-bore 38.

As shown in FIGS. 1 to 6, inside each concave portion 30 and 31 of the pillar portions 21 and 22, and the supporting portion 23, a rubber wobbling-prevention member 39 is respectively held. Each wobbling-prevention member 39 integrally comprises an axis portion 40; an umbrella head portion 41 integrally attached to one end portion of the axis portion 40; and a bulging portion 42 integrally provided in the axis portion 40 on the other end side rather than one end portion of the axis portion 40. A structure of the wobbling-prevention member 39 will be explained as an example of the wobbling-prevention member 39 in the concave portion 31 based on FIGS. 5 and 6.

The axis portion 40 extends in a state of passing through the through-bore 33 in the center portion in the radial direction of the bottom portion 31a in the concave portion 31. The axis portion 40 is slightly in a loosely fitted state relative to the through-bore 33, and an annular gap 43 is formed between an inner peripheral surface of the through-bore 33 and the axis portion 40. Thereby, while the axis portion 40 is guided to the through-bore 33, the axis portion 40 can slide or move relative to the through-bore 33. In the axis portion 40, one end side thereof is positioned on a torque converter housing wall 5 side as one member rather than the bottom portion 31a of the concave portion 31, and the other end side is positioned on a transmission case 3 side rather than the bottom portion 31a of the concave portion 31. Of these, one end side of the axis portion 40 protrudes such that one end portion thereof is positioned outwardly rather than an opening end of the concave portion 31.

The umbrella head portion 41 is disposed inside the concave portion 31 in a state of protruding to the outside from the opening of the concave portion 31. The umbrella head portion 41 expands in such a way as to expand a radius as the axis portion 40 goes from one end portion toward the other end side. An opening end surface of the head portion 41 abuts against the bottom portion 31a of the concave portion 31. Consequently, the head portion 41 envelopes one end side of the axis portion 40 internally. Accompanied by that, inside the head portion 41, an annular space is formed as the center of the axis portion 40. In the present embodiment, inner and outer surfaces of the head portion 41 are formed with smooth curved surfaces. Also, an abutted position of the opening end surface of the head portion 41 is positioned on an inward side in the radial direction only by a certain amount of distance rather than an inner peripheral portion of the concave portion 31, and the annular space as the center of the head portion 41 is formed between the head portion 41 and the inner peripheral portion of the concave portion 31.

Of the axis portion 40, the bulging portion 42 is formed on the other end side of the axis portion 40 rather than the bottom portion 31a of the concave portion 31. The bulging portion 42 has a size of expanding the radius more than the radius of the through-bore 33, and the bulging portion 42 and a peripheral border portion (the bottom portion 31a of the concave portion 31) of the through-bore 33 are abutted against each other. Consequently, the bulging portion 42 controls (retains) the axis portion 40 from moving (sliding) toward the outward side (an upper direction in FIGS. 4 and 5) on one end side thereof. Also, in cooperation with the head portion 41, the bottom portion 31a of the concave portion 31 is clamped so as to hold the wobbling-prevention member 39 in the bottom portion 31a of the concave portion 31 without wobbling.

In the present embodiment, the bulging portion 42 has a shape of expanding the radius as the axis portion 40 goes from the other end side toward one end side. This is because when the wobbling-prevention member 39 is assembled relative to the concave portion 31, the axis portion 40 in the wobbling-prevention member 39 is pushed into the through-bore 33 of the bottom portion 31a in the concave portion 31 from the other end side of the axis portion 40 so as to allow the bulging portion 42 to smoothly pass through the through-bore 33 while the bulging portion 42 is allowed to reduce the radius, and so as to allow the bulging portion 42 to be easily disposed on the other end side of the axis portion 40 rather than the bottom portion 31a of the concave portion 31. Also, this is because the retaining to the outward side on one end side of the axis portion 40 based on the bulging portion 42 is allowed to be further secured by an abutting relationship between an opening end surface of the bulging portion 42 including the largest radius, and the bottom portion 31a of the concave portion 31. Thereby, the wobbling-prevention member 39 is prevented from dropping out of the concave portion 31 (the intervening member) so as to reliably prevent assembling workability from declining.

When an external force F acts on the head portion 41 from the outside, such wobbling-prevention member 39 deforms in such a way that the head portion 41 is crushed toward the bottom portion 31a of the concave portion 31 based on the nature of rubber as a shape thereof and a material thereof. Accompanied by a deformation thereof, a repulsion force is generated toward the outward side on one end side of the axis portion 40 in the wobbling-prevention member 39. In that case, accompanied by a crushing deformation, the air inside the head portion 41 is discharged to the outside from the annular gap 43 between the inner peripheral surface of the through-bore 33 and the axis portion 40, so that the axis portion 40 moves toward the outward side on the other end side of the axis portion 40 while the axis portion 40 is guided by the inner peripheral surface of the through-bore 33 (see FIG. 6). Consequently, in the wobbling-prevention member 39, although the repulsion force is generated based on the crushing deformation of the head portion 41, the external force required for the crushing deformation thereof is relatively small based on a discharge of the air inside the head portion 41. Also, accompanied by the crushing deformation of the head portion 41, the air inside the head portion 41 is discharged from the annular gap 43 to the outside. Accordingly, at that time, an opening end of the head portion 41 is controlled from deforming in a direction of expanding the radius, and while preventing the head portion 41 from damage (fracture due to a radius expansion), the crushing deformation of the head portion 41 can be ensured.

As shown in FIGS. 1 and 6, accompanied by that the baffle plate 2 is intervened between the torque converter housing wall 5 and the intermediate wall 6, such wobbling-prevention member 39 is interposed between the torque converter housing wall 5 and the baffle plate 2 in the concave portions 31 and 37. At that time, the wobbling-prevention member 39 is clamped by the torque converter housing wall 5 and the baffle plate 2 so as to be compressed. Thereby, accompanied by the compression of the wobbling-prevention member 39, a repulsion force is generated, and due to the repulsion force thereof, the baffle plate 2 is prevented from wobbling between the torque converter housing wall 5 and the intermediate wall 6.

At that time, since not only the head portion 41 is made of rubber, but also the inside of the head portion 41 is hollow, compared to the head portion 41 whose inside is not hollow and is solid (for example, rubber bush), a compressive load relative to the baffle plate 2 can be lowered. Moreover, in the present embodiment, when the head portion 41 is crushed, the air inside the head portion 41 is discharged to the outside through the annular gap 43 so as to be capable of lowering the compressive load relative to the baffle plate 2 further. Consequently, it eliminates the need to excessively increase rigidity of the baffle plate 2 so as to be capable of expanding an applicable range of the rigidity of the baffle plate 2 to a low-side range.

Also, at that time, the concave portion 30 and the fitting convex portion 26 in the baffle plate 2 are respectively fitted into the bolt head portion 32 and the fitting concave place 27 of the intermediate wall 6, and the baffle plate 2 is controlled from sliding and also from relative-turning relative to the intermediate wall 6. Consequently, the baffle plate 2 is reliably held between the torque converter housing wall 5 and the intermediate wall 6 without wobbling in combination with a function of the aforementioned wobbling-prevention member 39.

Also, the head portion 41 and the bulging portion 42 of the wobbling-prevention member 39 clamp the bottom portion 31a of the concave portion 31 in the baffle plate 2, so that the wobbling-prevention member 39 is held in the bottom portion 31a of the concave portion 31 accurately. Consequently, at a time of an assembling operation of the torque converter housing wall 5, the baffle plate 2, and the transmission case 3, the wobbling-prevention member 39 can be prevented from dropping out so as to prevent the assembling workability from declining based on the dropping-out of the wobbling-prevention member 39.

In that case, when the wobbling-prevention member 39 is attached to the bottom portion 31a (37a) of each concave portion (37) in the baffle plate 2, in addition to forming the whole wobbling-prevention member 39 by rubber, the bulging portion 42 is set in such a way as to expand the radius as the axis portion 40 goes from the other end side toward one end side. Accordingly, it is only necessary to push the axis portion 40 in the wobbling-prevention member 39 into the through-bore 33 (38) of the bottom portion 31a (37a) in the concave portion 31 (37) from the other end side of the axis portion 40. Thereby, the bulging portion 42 smoothly passes through the through-bore 33 (38) while reducing the radius, so that the bulging portion 42 is easily disposed on the other end side of the axis portion 40 rather than the bottom portion 31a (37a) of the concave portion (37). Also, at that time, the bulging portion 42 abuts against the bottom portion 31a (37a) of the concave portion 31 (37) with a surface of the largest radius, and the wobbling-prevention member 39 is controlled (retained) from moving toward the outward side on one end side of the axis portion 40 so as to reliably prevent the wobbling-prevention member 39 from dropping out of the bottom portion 31a (37a) of the concave portion 31 (37).

Although the embodiment was explained above, the present invention comprises the following aspects.

(1) The first and second members, and the intervening member apply to not only the torque converter housing wall 5, the transmission case 3 (the intermediate wall 6), and the baffle plate 2, but also various kinds of members.

(2) The wobbling-prevention member 39 may be a resin molded item as a condition of ensuring a flexure property and the like.

(3) Without forming the fitting concave place 27 in the intermediate wall 6, the portion of the fitting concave place 27 is made by a flat surface. While an end portion (the fitting convex portion 26) of the pillar portion 21 is abutted against a flat surface thereof, the first or second control wall portions 18 and 19 and the like of the baffle plate 2 are abutted against the transmission case 3 (including an element) so as to control the baffle plate 2 from relative-turning at the center of the supporting portion 22. Thereby, it is not necessary to form the fitting concave place 27 in the intermediate wall 6 specially.

Incidentally, an object of the present invention is to provide an embodiment which is not only limited to the above-specified embodiment, but also an embodiment which corresponds to the embodiment described as it is substantively preferable or as an advantage as well.

The disclosure of Japanese Patent Application No. 2011-044181, filed on Mar. 1, 2011, is incorporated in the application.

While the invention has been explained with reference to the specific embodiments of the invention, the explanation is illustrative and the invention is limited only by the appended claims.

What is claimed is:

1. A holding structure of an intervening member, comprising:
a first member;
a second member provided parallel to the first member;
the intervening member provided between the first member and the second member, and having a supporting plate portion facing the first member or the second member, the supporting plate portion having a through-bore with an axis center extending in a direction perpendicular to the first and second members; and
an elastically deformable wobbling-prevention member provided between the intervening member and at least one of the first and second members in a compressed state to prevent the intervening member from wobbling;
wherein the wobbling-prevention member integrally includes:
an axis portion slidably passing through the through-bore of the supporting plate portion, and having one end portion positioned on a side of the first member relative to the supporting plate portion, and another end portion positioned on a side away from the first member relative to the supporting plate portion, the axis portion being slidably displaceably fitted in the through-bore of the supporting plate portion;
an elastic head portion integrally provided on the one end portion of the axis portion, with a radius thereof expanding from the one end portion to the supporting plate portion and a height thereof reducing from a center toward an outer peripheral edge portion thereof, the center thereof being highest so that when an external force is received, the center of the elastic head portion abuts against the first member, and the outer peripheral edge portion of the elastic head portion abuts against the supporting plate portion to prevent the intervening member from wobbling; and
a bulging portion formed on the side of the another end portion of the axis portion relative to the supporting plate portion and having a radius thereof expanding more than a radius of the through-bore, said bulging portion being elastic to pass through the through-bore and clamping the supporting plate portion in cooperation with the elastic head portion,
the axis portion is positioned in a loosely fitted state relative to the through-bore to form an annular gap between the axis portion and an inner peripheral surface of the through-bore; and an internal space inside the elastic head portion faces an outside through the annular gap,
the intervening member further comprises a concave portion having a bottom portion as the supporting plate portion arranged with the through-bore, and a sidewall portion defining an inner peripheral edge of the concave portion, and the elastic head portion of the wobbling prevention member protrudes outside of an opening of the concave portion beyond the sidewall portion of the concave portion from the inside of the concave portion to abut the first member, and
the intervening member further comprises a control wall portion extending perpendicular to the supporting plate portion; and the supporting plate portion comprises a connection wall portion extending parallel to the first member to face the first member and connected to the control wall portion, and a supporting portion protruding toward the first member, the supporting portion having the concave portion with the through-bore.

2. A holding structure of an intervening member according to claim 1, wherein
the supporting portion extends outwardly than the connection wall portion parallel to the first member.

3. A holding structure of an intervening member according to claim 2, wherein the radius of the outer peripheral edge portion of the elastic head portion is smaller than that of the sidewall portion of the concave portion so that an annular space is formed between the elastic head portion and the sidewall portion of the concave portion.

* * * * *